US010074932B2

(12) United States Patent
Juillet

(10) Patent No.: US 10,074,932 B2
(45) Date of Patent: Sep. 11, 2018

(54) SECONDARY TRANSFORMER BUSHING WITH INTEGRAL SEALING LEGS

(71) Applicant: Christopher Juillet, Hoboken, NJ (US)

(72) Inventor: Christopher Juillet, Hoboken, NJ (US)

(73) Assignee: Richards Manufacturing Company Sales, Inc., Irvington, NJ (US)

( * ) Notice: Subject to any disclaimer, the term of this patent is extended or adjusted under 35 U.S.C. 154(b) by 0 days.

(21) Appl. No.: 14/800,606

(22) Filed: Jul. 15, 2015

(65) Prior Publication Data

US 2017/0018915 A1 Jan. 19, 2017

(51) Int. Cl.
*H02G 3/18* (2006.01)
*H01R 13/52* (2006.01)
*H01R 4/70* (2006.01)

(52) U.S. Cl.
CPC .......... *H01R 13/5221* (2013.01); *H01R 4/70* (2013.01)

(58) Field of Classification Search
CPC ........... H02G 3/22; H02G 3/083; H02G 3/24; H02G 3/26; H02G 3/28; H01R 13/5202; H01R 13/5221; H01R 13/5205; H01R 4/70; H05K 5/067
USPC .... 174/650, 652, 656, 152 G, 153 G, 137 R, 174/152 R, 50.52; 16/2.1, 2.2
See application file for complete search history.

(56) References Cited

U.S. PATENT DOCUMENTS

| | | | | |
|---|---|---|---|---|
| 3,803,523 A * | 4/1974 | Farmer | H01B 17/306 | 174/152 R |
| 3,983,314 A * | 9/1976 | Filhaber | H01R 9/00 | 174/138 F |
| 4,463,227 A * | 7/1984 | Dizon | H01H 31/122 | 361/628 |
| 4,547,627 A * | 10/1985 | McGrane | H02G 15/12 | 174/138 F |
| 7,077,672 B2 * | 7/2006 | Krause | H01R 13/53 | 439/181 |
| 7,633,741 B2 * | 12/2009 | Hughes | H02B 11/26 | 174/70 B |
| 7,909,635 B2 * | 3/2011 | Hughes | H01R 13/53 | 174/84 R |
| 7,973,251 B1 * | 7/2011 | Pruitt | H02G 3/083 | 174/542 |
| 8,152,547 B2 * | 4/2012 | Hughes | H01R 13/46 | 439/282 |
| 8,399,771 B2 * | 3/2013 | Meyer | H01R 13/53 | 174/167 |
| 8,681,481 B2 * | 3/2014 | Patten | H02B 11/04 | 312/223.6 |
| 9,385,493 B2 * | 7/2016 | Maroney | H01R 25/162 | |

* cited by examiner

*Primary Examiner* — Angel R Estrada
(74) *Attorney, Agent, or Firm* — Bakos & Kritzer

(57) ABSTRACT

A secondary bushing with a sleeve for each conductive contact is disclosed. The secondary bushing is secured to a transformer wall by a mounting assembly and comprises a first side and second side. The first side is positioned within the transformer wall and includes a first conductor. The second side is positioned outside of the transformer wall and includes at least one cable connector that is coupled to a power cable. Instead of exposing the conductive contacts of the cable connector and power cable, a sleeve is inserted to insulate and seal each conductive contact.

20 Claims, 3 Drawing Sheets

SECONDARY TRANSFORMER BUSHING WITH INTEGRAL SEALING LEGS

CROSS-REFERENCE TO RELATED APPLICATIONS

The present invention claims priority to U.S. Provisional Application Ser. No. 62/025,425, filed on Jul. 16, 2014, and entitled "Secondary Transformer Bushing with Integral Sealing Legs," which is hereby incorporated by reference herein in its entirety, including any figures, tables, equations or drawings.

TECHNICAL FIELD

The present invention relates generally to bushings secured to transformer tanks.

BACKGROUND OF THE INVENTION

Primary and secondary bushings are utilized in step-down transformers in distribution networks. Typically, a network transformer includes primary bushings, which electrically couple the fluid filled interior of the network transformer with high input voltage. Secondary bushings provide output terminals from the transformer tank to low voltage (480V and under) power cables. Generally, the secondary bushing is welded into the transformer wall via a metal flange. The transformer is typically filled with oil, which acts as an insulation medium between the internal components of the transformer. As a result, the secondary bushing is molded from epoxy in order to ensure an adequate seal that prevents the transformer oil from leaking out of the transformer tank. Typically, the connector positioned outside of the transformer wall has bare copper bus bars that extend out from the epoxy. Currently, power cables are connected to this copper bus via lugs, which results in exposed and energized copper. Under normal conditions the presence of exposed conductive connections is not an issue due to the low voltage (480V and under) present. Further, insulation of the exposed conductive contacts is not necessary, because the distance between the exposed contacts and ground plane is far enough that flashovers do not occur.

However, the exposed contacts can result in electrical failures in situations where the water level outside of the transformer rises to the point that all exposed copper is submerged. This is problematic especially in salt water, which is more electrically conductive. As a result, there are flashovers from the copper bus bar on the bushing back to the grounded wall of the transformer. This can eventually cause a phase to ground or phase to phase failure.

Various solutions attempt to prevent these failures by placing a seal over all the contacts of the secondary bushing. A problem with a seal that encompasses all of the contacts is that it allows an air space to be present between the conductive component and the sealing device. Further, these designs often do not provide a sufficient moisture seal, because they use one piece that attempts to seal to multiple cable connectors. As a result, if one seal is compromised due to irregularities with the cable or environmental restrictions (tight cable bend radius or contamination), all adjacent cable connectors are also compromised. In addition, the presence of water between the conductive components and the sealing device provides a pathway for water to contact with the cable connector terminal.

Therefore, there is a need in the art to insulate the conductive connectors of the cable connectors of the secondary bushing. This is preferably accomplished by coupling a sleeve composed of insulative material over the connection. Further, there is a need to create an individual water seal for each of the cable connectors. This design reduces the chances of failures by preventing any water from coming into direct contact with the bus bar and seals each of the cable connections individually.

SUMMARY

A secondary bushing that is fully insulated and mates with a cable sealing sleeve is disclosed. The sleeve provides a fully insulated and sealed connection from the transformer to the power cables coupled to the secondary bushing. The outer housing of the secondary bushing is composed of molded epoxy or a combination of molded epoxy and rubber. The area surrounding the welded flange and submerged by the transformer oil is composed of epoxy in order to seal the transformer oil within the transformer tank. The portion of the bushing positioned outside of the transformer can be made from either epoxy or molded rubber. Power cables are coupled to cable connectors positioned outside of the transformer utilizing a standard bolted lug connection. Instead of exposing the conductive contacts of the cable connector and power cable, a sleeve is inserted to insulate and seal each conductive contact.

BRIEF DESCRIPTION OF THE DRAWINGS

The detailed description makes reference to the accompanying figures wherein.

Other objects, features, and characteristics of the present invention, as well as methods of operation and functions of the related elements of the structure and the combination of parts, will become more apparent upon consideration of the following detailed description with reference to the accompanying drawings, all of which form part of this specification.

DETAILED DESCRIPTION OF THE PREFERRED EMBODIMENT

A detailed illustrative embodiment of the present invention is disclosed herein. However, techniques, methods, processes, systems, and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, electronic or otherwise, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the Detailed Description of the Preferred Embodiment using the singular or plural number may also include the plural or singular number respectively. The word "or," in reference to a list of two or more items, covers all of the following interpretations of the word: any of the items in the list, all of the items in the list, and any combination of the items in the list. The following presents a detailed description of the preferred embodiment of the present invention with reference to the figures.

Figure 1A:
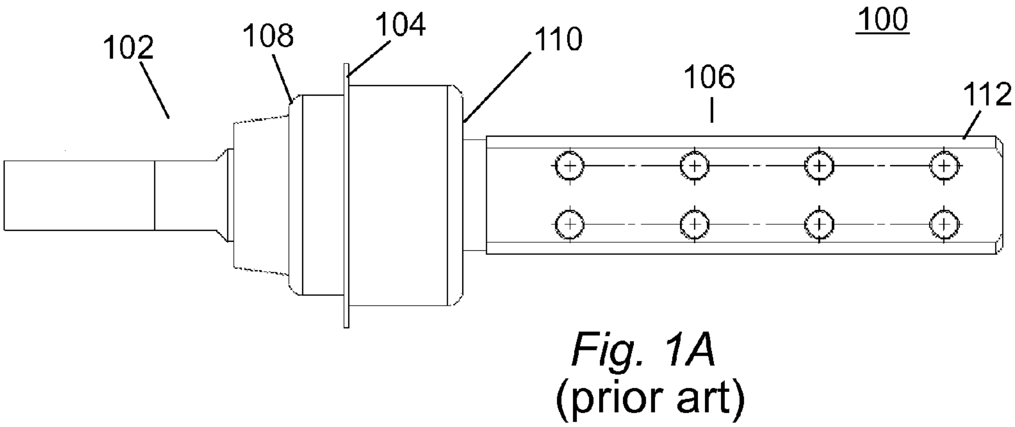
Fig. 1A (prior art)
FIG. 1A illustrates a side view of a prior art secondary bushing.
Figure 1B:
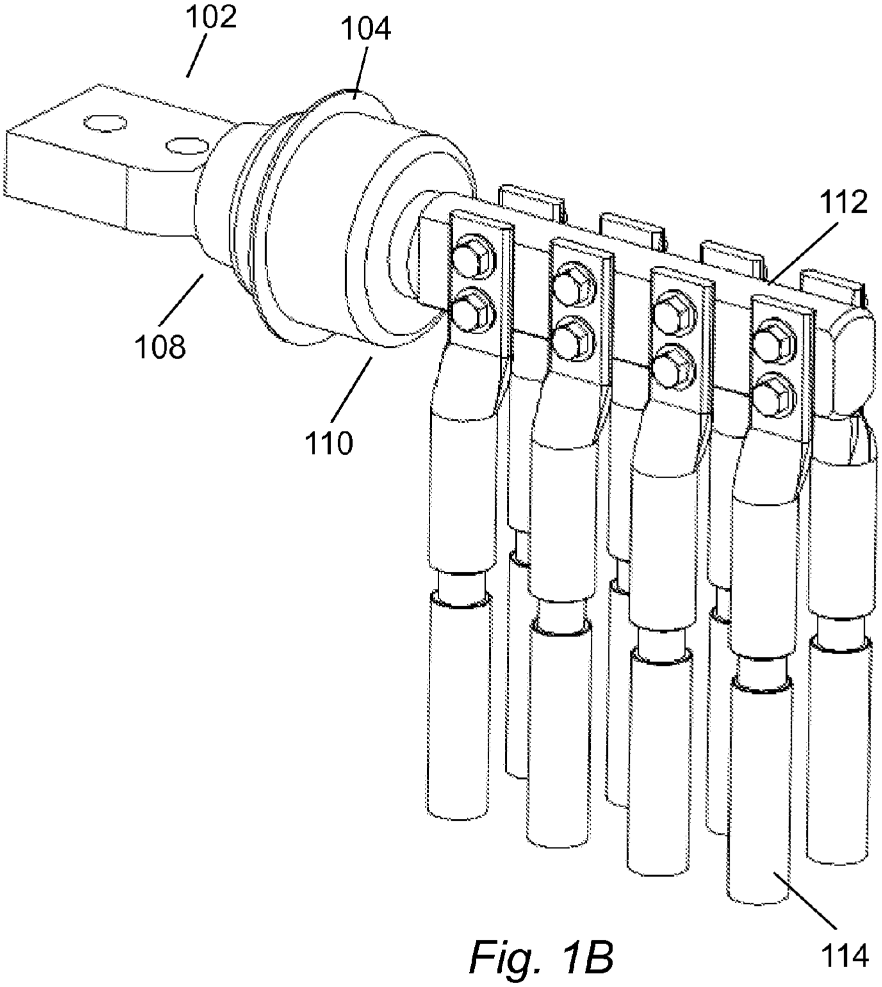
Fig. 1B (prior art)
FIG. 1B illustrates a perspective view of a prior art secondary bushing.

Referring initially to FIG. 1A and FIG. 1B, shown is prior art secondary bushing 100. Secondary bushing 100 comprises first side 102 and second side 106. Generally, first side 102 is welded to the wall of transformer tank via metal flange 104. As a result, first conductor 108 is positioned inside the transformer wall, while second conductor 110 is positioned outside the transformer wall. As shown in FIG. 1A, second conductor 110 includes a bus bar 112 composed of a conductive material. Bus bar 112 is exposed to the elements outside the transformer wall. At least one power cable 114 is electrically coupled to bus bar 112.

Under normal conditions, the presence of exposed bus bar 112 is not an issue. However, exposed bus bar 112 can result in an electrical failure when the water level outside of the transformer wall submerges bus bar 112. Known solutions attempt to address this issue by providing a sealing device that encompasses all of the exposed contacts (i.e. bus bar and cable connector). A problem with this design is that it can allow an air space to be present between the conductive components and the sealing device. Further, these designs often do not provide a sufficient moisture seal, due to the use of one piece that attempts to seal to multiple cable connectors.

Figure 2:
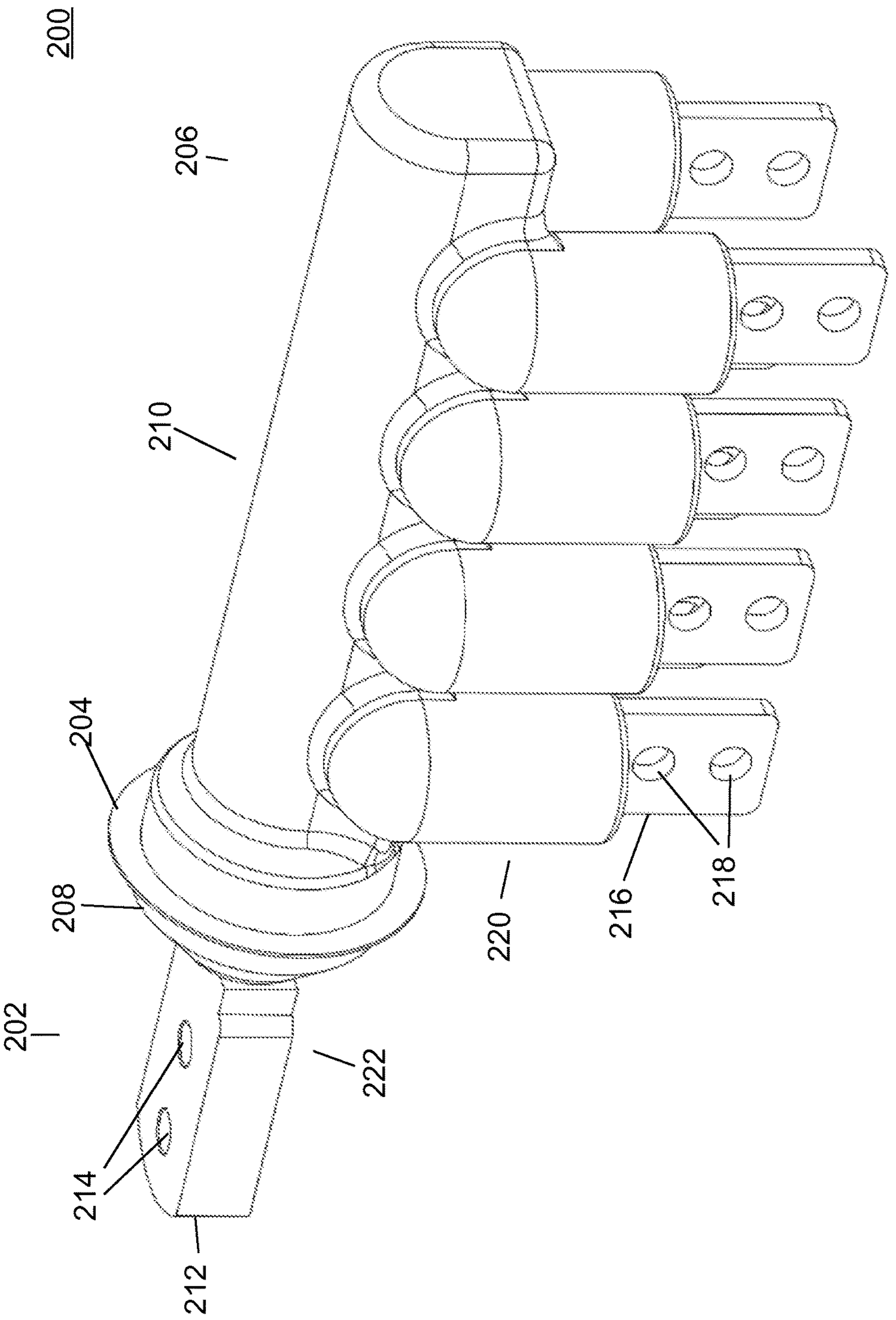
FIG. 2 illustrates a perspective view of a secondary bushing in accordance with the preferred embodiment of the present invention.

Referring now to FIG. 2, secondary bushing 200 comprises first side 202 and second side 206. First side 202 is preferably installed into the aperture of a tank transformer wall. Within the transformer wall, first side 202 is submerged in transformer oil, Envirotemp FR3 fluid, or any other dielectric fluid known in the art. As a result, insulation bushing 208 is preferably composed of epoxy or elastomer in order to adequately seal and prevent the dielectric fluid in the tank transformer from leaking.

As shown in FIG. 2, first conductor 222 comprises insulation bushing 208 and spade connector 212. Spade connector 212 is composed of a conductive material, for example copper or aluminum, and comprises at least one mounting hole 214. Mounting hole 214 is configured to couple at least one connector to spade connector 212 utilizing a lug. In the preferred embodiment, first side 202 is electrically coupled to the secondary coil windings of a transformer.

Secondary bushing 200 also includes mounting flange 204. Mounting flange 204 is preferably annular with a substantially larger diameter than the transformer aperture that first side 202 is installed within. Therefore, mounting flange 204 abuts the transformer wall during the installation process of first side 202 into the transformer aperture. Thereafter, mounting flange 204 is preferably welded to the transformer wall to secure secondary bushing 200. It would be readily apparent to one of ordinary skill in the art to utilize other methods to secure secondary bushing 200 to a transformer wall, for example clamping, without departing from the spirit of the present invention.

In FIG. 2, second side 206 of secondary bushing 200 comprises second conductor 210. Second conductor 210 is positioned outside of the transformer wall when first side 202 is installed. During normal conditions, second side 206 is exposed to air. However, second side 206 could be submerged due to an increase in water level outside the transformer wall due to heavy rain. The housing of second conductor 210 preferably comprises molded epoxy. It would be readily apparent to one of ordinary skill in the art to utilize a combination of epoxy and rubber, or rubber for the housing of second conductor 210. Further, second conductor 210 includes at least one cable connector 220. In the preferred embodiment, cable connector 220 comprises spade connector 216 and at least one mounting hole 218. Spade connector 216 is composed of a conductive material, for example copper or aluminum. Mounting hole 218 is configured to couple a power cable to spade connector 216 utilizing a lug. As described below in detail and with reference to FIG. 3, each cable connector 220 is arranged to allow the installation of a sleeve over the exposed conductors of a power cable coupled to cable connector 220. This design provides an insulated and sealed connection, thereby preventing electrical failure due to rising water submerging the second side of the secondary bushing.

Figure 3:
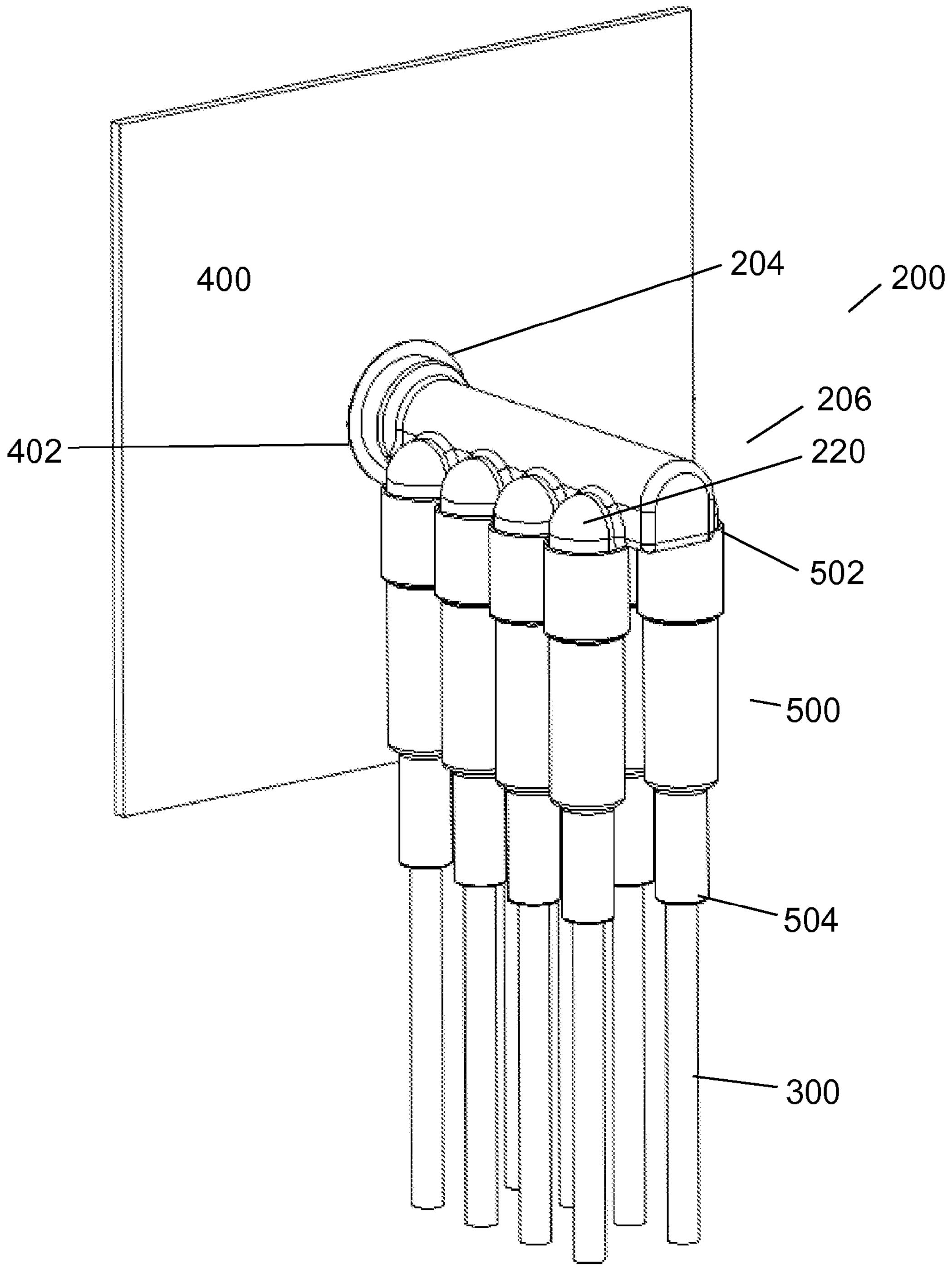
FIG. 3 illustrates a perspective view of the secondary bushing shown in FIG. 2 coupled to a transformer and with integral sealing sleeves.

Turning next to FIG. 3, shown is a perspective view of secondary bushing 200 depicted in FIG. 2 secured to transformer wall 400. The first side (not shown) of secondary bushing 200 is inserted into transformer wall 400 through transformer aperture 402, until mounting flange 204 abuts transformer wall 400. Thereafter, secondary bushing 200 is secured to transformer wall 400 by welding mounting flange 204 to transformer wall 400. As shown in FIG. 3, second side 206 of secondary bushing 200 is positioned outside of transformer wall 400. In addition, power cable 300 is coupled to the spade connector (not shown) of cable connector 220.

Instead of exposing the conductive connection between the spade connector and power cable, the present invention provides sleeve 500 to insulate and seal the connection. Sleeve 500 is generally tubular and exhibits a substantially hollow center for insulating and sealing the connection of cable connector 220 and power cable 300. Sleeve 500 is preferably composed of one of two distinct materials common in the art, ethylene propylene diene monomers (EPDM) or silicon rubber, and includes a first end 502 and a second end 504. First end 502 of sleeve 500 is preferably coupled to cable connector 220 utilizing an interference fit. In the preferred embodiment, the inside diameter of the first end 502 of sleeve 500 is smaller than the inner diameter of the housing of cable connector 220. Similarly, second end 504 of sleeve 500 is preferably coupled to power cable 300 utilizing an interference fit. The inside diameter of second end 504 of sleeve 500 is preferably smaller than the inner diameter of power cable 300. During the installation process of sleeve 500, lubricant can be applied along the outside of the power cable and cable connector and/or the inside of sleeve 500. This ensures a snug fit that reduces the presence of air around the conductive connectors of the power cable and cable connector.

While the present invention has been described with reference to the preferred embodiment, which has been set forth in considerable detail for the purposes of making a complete disclosure of the invention, the preferred embodiment is merely exemplary and is not intended to be limiting or represent an exhaustive enumeration of all aspects of the invention. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A secondary bushing comprising:

a first conductor comprising an insulation bushing and at least one conductive connector;

a mounting flange;

a second conductor, comprising a plurality of cable connectors; and at least one sleeve;

wherein the first conductor is positioned at a first side;

wherein the first side is coupled to a sealed enclosure with the mounting flange and positioned inside the sealed enclosure;

wherein the second conductor and the at least one sleeve are positioned at a second side positioned outside of the sealed enclosure;

wherein the at least one conductive connector of the first conductor is electrically coupled to the plurality of cable connectors of the second conductor;

wherein the at least one sleeve is coupled over at least one cable connector of the second conductor; and wherein the at least one sleeve is configured to seal the at least one cable connector from a fluid when the second side is submerged by the fluid.

2. The secondary bushing of claim 1, wherein the insulation bushing of the first conductor is composed of an oil resistant material.

3. The secondary bushing of claim 1, wherein the mounting flange is composed of metal.

4. The secondary bushing of claim 1, wherein the mounting flange is molded to an insulation material.

5. The secondary bushing of claim 1, wherein the sleeve is cylindrical and substantially hollow, and wherein the sleeve is coupled to the at least one cable connector of the second conductor using an interference fit.

6. A secondary bushing comprising:

a first side;

a mounting assembly;

a second side;

a conductor; and at least one sleeve;

wherein the conductor comprises a plurality of cable connectors;

wherein the conductor and the at least one sleeve are positioned at the second side; and wherein the at least one sleeve is configured to seal at least one cable connector from a fluid when the second side is submerged by the fluid.

7. The secondary bushing of claim 6, wherein the at least one sleeve is coupled to at least one cable connector.

8. The secondary bushing of claim 6, wherein a housing of the first side and a housing of the conductor are composed of insulating material.

9. The secondary bushing of claim 6, wherein the sleeve is substantially hollow and composed of EPDM.

10. The secondary bushing of claim 6, wherein the sleeve is substantially hollow and composed of silicon rubber.

11. The secondary bushing of claim 7, wherein the at least one sleeve is coupled to the at least one cable connector using an interference fit.

12. The secondary bushing of claim 7, wherein the at least one cable connector comprises a spade connector.

13. A system comprising:

a sealed enclosure comprising, an aperture;

a secondary bushing comprising, a mounting assembly, a plurality of cable connectors, wherein the plurality of cable connectors are positioned at a second side;

at least one power cable; and at least one sleeve;

wherein the at least one power cable and the at least one sleeve are positioned at the second side; and wherein the at least one sleeve is configured to seal at least one of the plurality of cable connector from a fluid when the second side is submerged by the fluid.

14. The system of claim 13, wherein a first side of the secondary bushing is coupled to the aperture of the sealed enclosure utilizing the mounting assembly of the secondary bushing.

15. The system of claim 14, wherein the mounting assembly comprises a flange that is welded around the aperture of the sealed enclosure.

16. The system of claim 13, wherein the at least one power cable is coupled to at least one cable connector of the secondary bushing.

17. The system of claim 16, wherein the at least one sleeve is coupled over a portion of the at least one power cable and a portion of the at least one cable connector.

18. The system of claim 17, wherein the at least one sleeve is coupled using an interference fit.

19. The system of claim 13, wherein the sealed enclosure is a transformer.

20. The system of claim 19, wherein the sealed enclosure is filled with a dielectric fluid.

* * * * *